United States Patent [19]
Van Damme

[11] Patent Number: 5,979,958
[45] Date of Patent: Nov. 9, 1999

[54] UTILITY RING MEMBER AND CHOKER USING SAME

[76] Inventor: Richard Van Damme, 26841 Doble, Eugene, Oreg. 97402

[21] Appl. No.: 09/157,085

[22] Filed: Sep. 18, 1998

Related U.S. Application Data

[60] Provisional application No. 60/060,686, Sep. 18, 1997.

[51] Int. Cl.[6] .................. B66C 1/12; F16G 11/14
[52] U.S. Cl. ................. 294/82.14; 294/74; 24/122.6
[58] Field of Search .............. 294/74, 75, 82.1, 294/82.14, 102.1; 24/115 R, 115 M, 122.6, 136 R, 136 L; 403/248, 250

[56] References Cited

U.S. PATENT DOCUMENTS

| | | | |
|---|---|---|---|
| 2,359,307 | 10/1944 | Evans | 294/74 |
| 3,319,990 | 5/1967 | Beal | 294/74 |
| 3,775,811 | 12/1973 | Smrekar et al. | 24/122.6 |
| 4,055,365 | 10/1977 | Kucherry | 294/82.14 |
| 4,188,141 | 2/1980 | Stoot | 294/82.14 |
| 4,333,675 | 6/1982 | Wirkkala | 24/122.6 |
| 5,415,490 | 5/1995 | Flory | 24/122.6 |

FOREIGN PATENT DOCUMENTS

| | | | |
|---|---|---|---|
| 2025410 | 3/1992 | Canada | 24/122.6 |
| 248185 | 3/1926 | United Kingdom | 24/122.6 |

*Primary Examiner*—Dean J. Kramer
*Attorney, Agent, or Firm*—Steven J. Adamson

[57] ABSTRACT

A utility linkage apparatus configured in a preferred embodiment to have a ring-like member that has a longitudinal dimension that is greater than a dimension approximately perpendicular thereto. Various ring member configurations are disclosed as are mechanisms for releasably securing a cable to the ring member. A choker that utilized the ring member and releasable cable attachment mechanism is also disclosed.

20 Claims, 2 Drawing Sheets

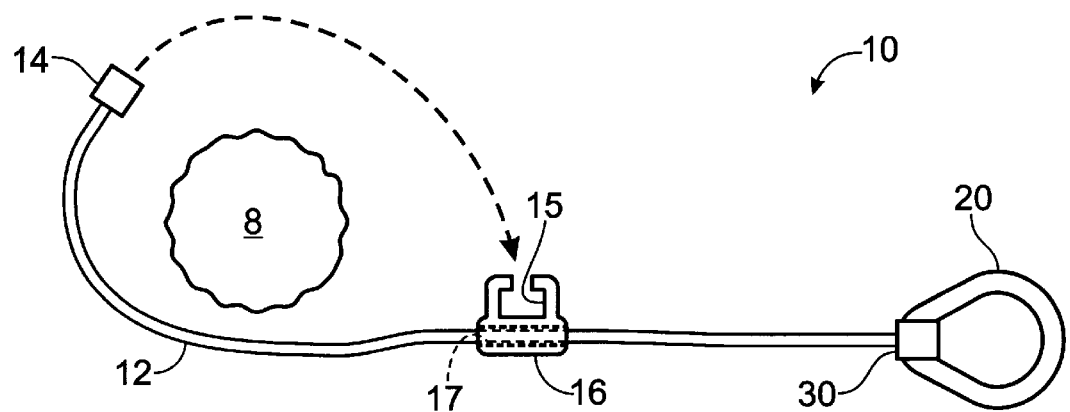
Fig. 1
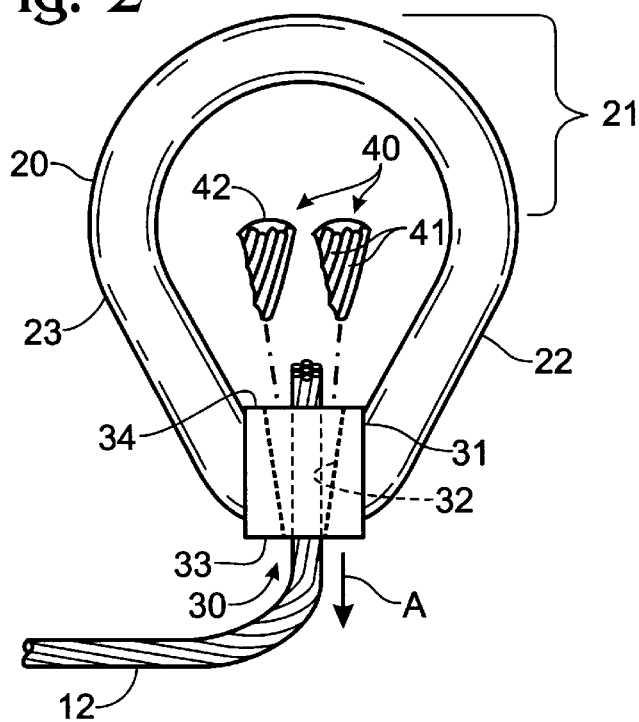
Fig. 2
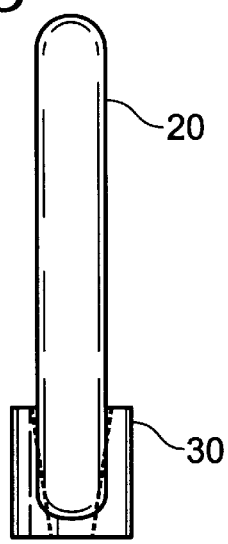
Fig. 3
Fig. 4

UTILITY RING MEMBER AND CHOKER USING SAME

CROSS REFERENCE TO RELATED APPLICATIONS

This application claims the benefit of U.S. Provisional Application No. 60/060,686, filed Sep. 18, 1997, and having the same title and inventor as above.

FIELD OF THE INVENTION

The present invention relates to utility rings or ring-like members. The present invention also relates to the use of such devices in logging operations.

BACKGROUND OF THE INVENTION

The prior art contains many arrangements for providing an attachment ring or loop at the end of a steel cable. The prior art also includes many arrangements for removing a felled tree (a log) from a forest floor.

A common method of removing a log from a forest floor includes attaching the log to a drag cable that is connected at an opposite end to a retraction drive motor. Activation of the motor causes the log to be drug or lifted to a desired location.

Log attachment lines (commonly termed "chokers") are attached to the logs and coupled to the drag cable. Chokers usually consist of a short piece of cable that includes at one end a log attachment mechanism and at the opposite end a drag cable attachment mechanism. The drag line or drag cable attachment mechanism frequently contains a looped back portion of line (forming an "eye") and may contain in addition a circular steel ring provided through the eye that permits attachment by a snap, bell or hook on the end of the drag cable.

While beneficial to some extent, this prior art arrangement has several disadvantages. One disadvantage is that the section where the drag line or circular ring contacts the eye often wears out and a substantial section of line is required to reform the eye, hence appreciably reducing the length of choker. Other disadvantages include that (1) it is difficult to reform a worn eye (i.e., it is difficult to braid, thread or otherwise reconnect the end of a cable along a cable segment), (2) the eye is large and tends to get caught on brush (forest plants), (3) broken strands within the eye are a hazard to workers, and (4) the eye is undesirably heavy because a significant amount of cable is required for its formation.

Another disadvantage of this arrangement is that the circular ring tends to bend under the force exerted by the retraction motor (the "drag force"), resulting in a reduction in structural integrity and an increase in the possibility of ring failure. To reduce the potential of ring failure, excessively heavy rings are often used.

With regard to non-choker applications, pear-shaped rings that withstand more stretching force than circular rings are known in the art. Cylindrical nubs with wedge shaped internal cavities are also known. Conventional methods of mounting these nubs to a cable include pouring a molten lead-zinc composite into the wedge cavity through which the cable is inserted. The solidified (cooled) composite serves to steadfastly hold the cable within the nub. The necessity of heating and cooling the composite to reposition a nub is disadvantageously burdensome. The use of lead, a known toxin, is another disadvantageous aspect of this arrangement.

SUMMARY OF THE INVENTION

Accordingly, it is an object of the present invention to provide a utility ring or related member that is shaped to withstand considerable drag force and includes a cable attachment mechanism.

It is another object of the present invention to provide such a ring and cable attachment mechanism that permits ready fastening to and release of a cable provided at the cable attachment mechanism.

It is also an object of the present invention to provide a choker that includes such a ring and cable attachment mechanism.

These and related objects of the present invention are achieved by use of a utility ring and choker as disclosed herein.

The attainment of the advantages and features of the invention should be more readily apparent to those skilled in the art, after review of the following more detailed description of the invention taken together with the drawings.

BRIEF DESCRIPTION OF THE DRAWINGS

FIG. 1 is a diagram of a choker including a ring and cable attachment mechanism in accordance with the present invention.

FIGS. 2–4 are front, side and bottom views of the ring and cable attachment mechanism of FIG. 1 in accordance with the present invention.

DETAILED DESCRIPTION

Figure 5:
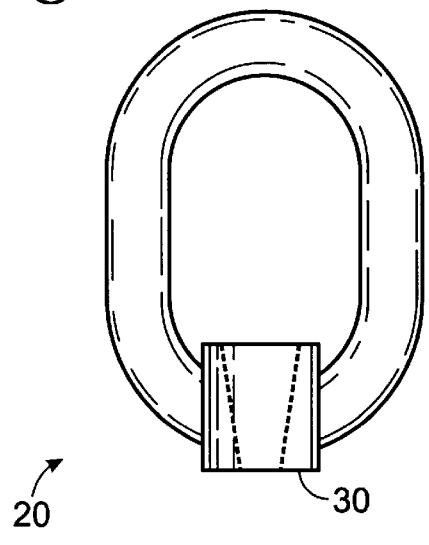
FIGS. 5, 6 and 7A–7B are views of alternative embodiments of the ring of FIGS. 1–4 in accordance with the present invention.

Referring to FIG. 1, a diagram of a choker 10 including a ring 20 and a cable attachment nub 30 in accordance with the present invention is shown.

Choker 10 includes a length of cable 12 or other suitable flexible, linearly disposed material, a stopper 14, a receptacle block 16, and ring 20 and nub 30. The receptacle block 16 contains a cylindrical opening 17 through which cable 12 passes. Stopper 14 prevents block 16 from sliding off the cable and may be a nub (as discussed in more detail elsewhere herein) or other suitable mass that can be securely fastened to the end of cable 12 (and fit into receptacle 15, described below).

In operation, cable 12 and stopper 14 are placed about at log 8 and stopper 14 is inserted in a complimentary receptacle 15 in receptacle block 16. The opposite end of cable 12 (that containing ring 20) is then pulled through opening 17 until cable 12 tightly encircles (or "chokes") log 8. A drag cable connected to a retraction motor (not shown) is coupled to ring 20 for dragging/lifting the log (often through troublesome brush) to a desired location. Accordingly, a considerable amount of force is exerted on and through ring 20 during removal of the log.

Referring to FIGS. 2–4, front, side and bottom views of ring 20 and nub 30 in accordance with the present invention are shown. Ring 20 is preferably shaped to efficaciously withstand the significant drag force used in log extraction. Preferred shapes for ring 20 include pear-shaped, elliptical, egg-shaped, oblong, trapezoidal and other shapes that have a principal longitudinal axis that is greater than a perpendicular dimension. While not preferred, the use of a circular ring with a cable attachment mechanism as discussed herein or the like is intended to be within the present invention. Ring 20 preferably includes a generally semi-circular region 21 and two members 22, 23 that converge therefrom towards nub 30. Empirical evidence has shown that pear shaped rings and the like withstand significantly greater stretching forces than circular rings before deforming. Pair-shaped rings and the like also move more efficiently through brush and pose less of a safety risk for workers.

While a ring configuration is preferred, it should be recognized that a plate member or other type of member that includes a drag line and a cable attachment and shape considerations as discussed herein is also within the present invention.

Nub 30 consists generally of a block 31 of rigid material such as steel within which is formed a conical cavity and opening 32 that completely traverses the block of rigid material.

In a preferred embodiment, the interior wall of the nub is disposed at approximately seven degrees from vertical (though other angles are contemplated). Empirical evidence has shown that when used with inserts (of a type described below) seven degrees is an optimal angle for both the secure mounting and ready release of cable 12 from nub 30. While an angle of less than approximately ten degrees is often suitable for the interior wall of nub 30, it should be recognized that the angle may be greater than ten degrees depending on the configuration of inserts, type of cable or type of fastening means (if inserts are not utilized).

Referring more specifically to FIG. 2, to mount cable 12 to ring 20, an end of cable 12 is inserted through opening 32 generally as shown. Cable 12 is preferably a conventional steel cable that contains seven strands, a center strand and six others arranged hexagonally around the center strand. To mount cable 12 to nub 30, the six hexagonal strands are pulled back from the center strand and placed in corresponding grooves 41 in inserts 40. The center strand fits into a center groove 42 in the inserts. Cable 12 is then pulled in the direction of arrow A until the inserts are securely positioned in opening 32, effectively wedging themselves therein such that cable 12 can no longer move in the direction of arrow A. The insertion of inserts into a cable as described above is known in the art, though their use in chokers and utility rings or like members is not known. The combination of nub 30 and suitable inserts 40 therefor which permit ready fastening to and release of a cable is generally referred to as a "quickie nub."

After extended use, cable 12 may begin to wear (crystallize) near the bottom of the nub. A worn cable near bottom 33 is remedied by cutting the cable below the worn section, pushing the inserts to the cut segment of cable therewith out of opening 32, reinserting intact cable 12 through opening 32 and reinserting the inserts and moving the cable and inserts in the direction of arrow A as described above. With this procedure, a relatively small amount of choke cable 12 is lost each time cable 12 wears out proximate nub 30. The amount of cable is small, for example, compared to the amount of cable needed to reform a braided "eye" in the end of a choker cable. Formation of a braided eye is also more time consuming.

Ring 20 and nub 30 can be made by several techniques that are known in the art. These include welding the ring to the nub, (cutting the ring first, if necessary), casting the ring and nub combination, and forging the ring and nub (regardless of how formed) to achieve a desired final configuration (for example, forming surface 26 of FIGS. 7A–7B), amongst other techniques.

With respect to nub 30, other cable attachment mechanisms are contemplated by the inventor and are within the scope of the present invention. These include, for example, providing one or two half collars around the cable and within nub opening 32 that are coupled to bolts threaded through the nub's cylindrical wall (note that the walls of opening 32 could have a zero angle in this implementation). Tightening the bolt(s) would secure the ring to the cable. This arrangement requires use of an additional tool (a wrench) for fastening or release of the cable, whereas the use of inserts does not require use of an additional tool. Mechanisms that attach directly to the cable are also contemplated.

Figure 6:
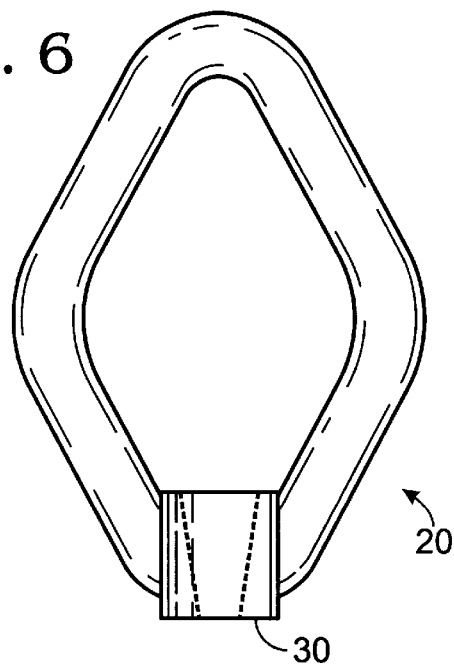

Referring to FIGS. 5–6, front views of alternative embodiments of ring 20 of FIGS. 1–4 in accordance with the present invention are shown. FIG. 5 illustrates an oblong ring 20, while FIG. 6 illustrates a rounded trapezoid (or rounded diamond) shaped ring 20.

Figure 7A:
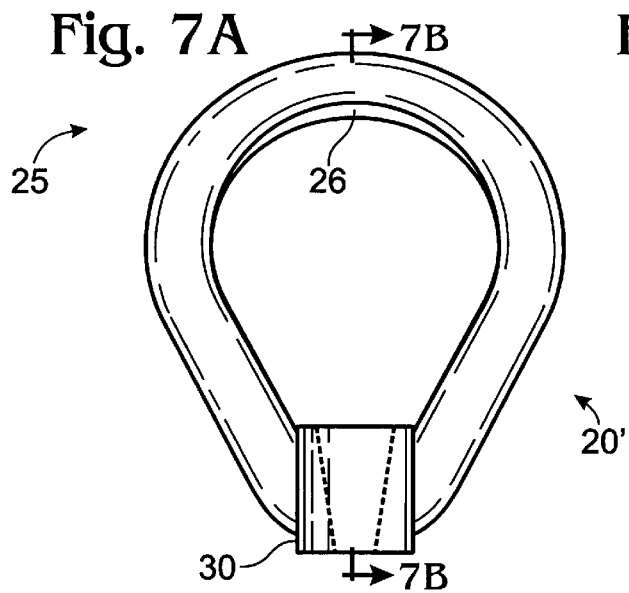
Figure 7B:
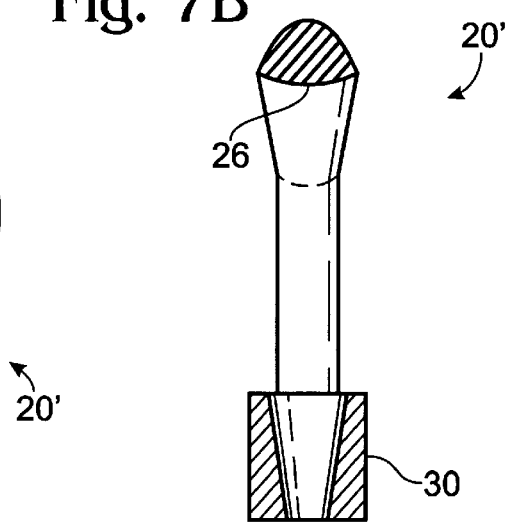

Referring to FIGS. 7A–7B, a front view and a side view of another alternative embodiment of ring of FIGS. 1–4 in accordance with the present invention are shown. A top portion 25 of ring 20' is configured to have a more gently rounded bottom surface 26 and hence portion 25 may approximate a bell shape in cross-section as shown in FIG. 7B. Surface 26 produces less wear on a line that is inserted through ring 20' in a direction generally perpendicular to the longitudinal plane of the ring (in FIG. 7B). Amongst other situations, this surface configuration is significant where a plurality of logs are being extracted and the drag line is threaded sequentially through the ring 20 (20') of the choker attached to each log. This technique of log collection is frequently used when logs are relatively widely distributed. A less gently rounded bottom surface on portion 25 would more rapidly wear a line feed generally perpendicularly through the ring.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A utility ring apparatus for use with a choker cable, comprising:

a substantially planar ring member formed of rigid material and having a longitudinal length dimension along a longitudinal axis that is greater than a latitudinal length dimension, said ring member being configured to withstand a significant pulling force along the longitudinal axis;

a cable attachment nub formed integrally with said ring member, said nub having a channel formed therethrough for insertion of a cable, said channel having an axis that is substantially aligned with the longitudinal axis and further defining an interior opening disposed inward of said ring member and an exterior opening disposed outward of said ring member;

said channel having an inner wall that is angled relative to the longitudinal axis such that the interior opening is larger than the exterior opening;

said ring member including a line attachment region and first and second connecting sections that connect opposite ends of the line attachment region to said cable attachment nub;

wherein said first and second connecting sections taper from said line attachment region to said nub, relative to the longitudinal axis, and the angle of said taper is greater than the angle of said channel inner wall relative to same.

2. The apparatus of claim 1, wherein said ring member is substantially open between said line attachment region and said cable attachment nub to permit ready access to said cable attachment nub on the inward side of said ring member for removing and reinstalling a cable at the cable attachment nub.

3. The apparatus of claim 1, wherein the angle of said channel inner wall is within the range of approximately 1 to 20 degrees.

4. The apparatus of claim 1, wherein the angle of said channel inner wall is within the range of approximately 4–13 degrees.

5. The apparatus of claim 1, wherein said ring member has substantially one of the group of shapes including:

non-circular, pear shaped, trapezoidal, diamond shaped, oblong, or elliptical.

6. The apparatus of claim 1, wherein said line attachment region is configured to have a cross-sectional dimension perpendicular to the plane of said ring member that is greater than a similarly disposed cross-sectional dimension of said connecting sections.

7. The apparatus of claim 1, wherein said line attachment region is configured to have a surface disposed towards the interior of said ring member that is less rounded than an interior surface of another region of said ring member.

8. The apparatus of claim 7, wherein said less rounded surface has a radius greater than that of a region of said member between said line attachment region and said cable attachment nub and thus provides a larger bearing surface.

9. The apparatus of claim 1, further comprising an insert wedge configured for placement in said channel that releasably secures a cable to said cable attachment nub.

10. The apparatus of claim 1, further comprising a plurality of insert wedges configured for placement in said channel along with a cable to releasably secure that cable to the ring member.

11. The apparatus of claim 10, wherein said insert wedges are substantially hemi-conical.

12. The apparatus of claim 1, further comprising:

a cable releasably coupled at said cable attachment nub; and a log attachment mechanism provided at an end of said cable opposite said cable attachment nub.

13. A utility ring apparatus for use with a choker, comprising:

a substantially planar ring member formed of rigid material and having a longitudinal length dimension along a longitudinal axis that is greater than a latitudinal length dimension;

a cable attachment nub formed integrally with said ring member, said nub having a channel formed therethrough for insertion of a cable, said channel having an axis that is substantially aligned with the longitudinal axis and further defining an interior opening disposed inward of said ring member and an exterior opening disposed outward of said ring member;

said channel having an inner wall that is angled relative to the longitudinal axis such that the interior opening is larger than the exterior opening;

said ring member including a line attachment region and first and second connecting sections that connect opposite ends of the line attachment region to said cable attachment nub;

wherein said first and second connecting sections taper from said line attachment region to said nub, relative to the longitudinal axis, and the angle of said taper is greater than the angle of said channel inner wall relative to same;

wherein said ring member is substantially open between said line attachment region and said cable attachment nub to permit ready access to said cable attachment nub on the inward side of said ring member for removing and reinstalling a cable at the cable attachment nub.

14. The apparatus of claim 13, wherein said ring is configured to have a greater stretch withstanding force along a first dimension than along a second dimension generally perpendicular to said first dimension.

15. The apparatus of claim 13, further comprising insert wedges that can be inserted in said channel with a cable in such a manner as to releasably secure that cable to said ring member.

16. A choker apparatus, comprising:

a cable;

a log attachment mechanism provided at one end of said cable; and a substantially planar linkage ring member provided at another end of said cable;

said ring member being formed of a rigid material and having a dimension along a longitudinal axis that is greater than a dimension along a axis generally perpendicular thereto;

said ring member comprising a cable attachment nub formed integrally with said ring member, said nub having a channel formed therethrough for insertion of said cable, said channel having an axis that is substantially aligned with the longitudinal axis of said ring member and further defines an interior opening disposed inward of said ring member and an exterior opening disposed outward of said ring member;

said ring member further comprising a line attachment region and first and second connecting sections that connect opposite ends of the line attachment region to said cable attachment nub, said first and second connecting sections tapering from said line attachment region to said nub;

wherein said ring member is substantially open between said line attachment region and said cable attachment nub to permit ready access to said cable attachment nub on the inward side of said ring member for removing and reinstalling the cable at the cable attachment nub.

17. The apparatus of claim 16, further comprising a plurality of insert wedges for releasably securing said cable at said cable attachment nub.

18. The apparatus of claim 16, wherein said ring member has substantially one of the group of shapes including:

non-circular;

pear shaped, trapezoidal, diamond shaped, oblong and elliptical.

19. The apparatus of claim 16, wherein said channel has an inner wall that is angled relative to the longitudinal axis of said ring member such that said interior opening is larger than said exterior opening.

20. The apparatus of claim 19, wherein said first and second connecting sections taper from said line attachment region to said nub, relative to the longitudinal axis, and the angle of the taper is greater than the angle of said channel inner wall relative to same.

* * * * *